(12) United States Patent
Grow

(10) Patent No.: US 6,694,315 B1
(45) Date of Patent: Feb. 17, 2004

(54) ONLINE DOCUMENT ASSEMBLY AND DOCKETING METHOD

(76) Inventor: John B. Grow, 3619 S. Newport Way, Denver, CO (US) 80237

(*) Notice: Subject to any disclaimer, the term of this patent is extended or adjusted under 35 U.S.C. 154(b) by 0 days.

(21) Appl. No.: 09/405,411

(22) Filed: Sep. 24, 1999

(51) Int. Cl.[7] .......................... G06F 17/30; G06F 15/16; G06F 12/00; G06F 17/60
(52) U.S. Cl. .................. 707/10; 707/2; 707/3; 707/104.1; 707/8; 707/9; 715/501; 715/513; 709/202; 709/203; 709/217; 709/218; 705/26
(58) Field of Search .............................. 707/1, 2–3, 10, 707/104.1, 8, 9; 709/201–203, 217–218; 705/26; 715/501, 513

(56) References Cited

U.S. PATENT DOCUMENTS

| | | |
|---|---|---|
| 5,222,236 A | 6/1993 | Potash et al. |
| 5,323,313 A | 6/1994 | Davis et al. |
| 5,329,447 A | 7/1994 | Leedom, Jr. |
| 5,729,751 A | 3/1998 | Schoolcraft |
| 5,799,325 A | 8/1998 | Rivette et al. |
| 5,895,468 A * | 4/1999 | Whitmyer, Jr. ............... 707/10 |
| 6,182,078 B1 * | 1/2001 | Whitmyer, Jr. ............... 707/10 |

OTHER PUBLICATIONS

Compulaw, Calendaring/Docket Control, Internet Article, May 12, 1999, 3 pages, Los Angeles, CA, compulaw.com/products.htm.
Fall 1999 Buyer's Guide, Advertising Guide, Fall 1999, pp. 23 and 24.
Digital Contracts, Inc., Save Thousands with ContractMaker For Software and Internet Companies, Internet Article, Sep., 23, 1999, 2 Pages, Roswell, Georgia, digicontracts.com.
Bradford Publishing Company, 1998–1999 Catalog, Catalog, 1998–1999, pp. 4 and 5, Denver, Colorado.
Aba Journal, David Beckman and David Hirsch, What's Up With HotDocs, Article, Jan. 1998, p. 75.
Legal Technology, Legal Technology Directory Index, Advertisement Index, 1998, 10 pages.
Corp–Kit Northwest, Inc., Corporation Kits for Colorado, Advertisement, Apr. 1998, p. 32, vol. 27, No. 4, The Colorado Lawyer.
Amlaw Tech, Power Tools for Document Preparation, Article, Spring 1998, pp. 78–81, The American Lawyer's Technology Magazine.
The Company Corporation, You Can Form Own Corporation by Phone, in Any State, in as Little as 24 Hours, as Low as $45, Advertisement, 1997, 1 page.
Michie, Save Time with Michie's Colorado Forms & Forms on Disk!, Advertisement, Mar., 1996, p. 56, vol. 25, No. 3, The Colorado Lawyer.
Legal Technologies, Inc., Colorado Simple Wills, Advertisement, Mar. 1996, p. 52, vol. 25, No. 3, The Colorado Lawyer.

(List continued on next page.)

*Primary Examiner*—Frantz Coby

(57) ABSTRACT

An online document assembly and docketing method using a user workstation interconnected over a network backbone to a website. A registered user inputs identification information at the user workstation which is received at the website. Case data or information is then received at the website from the user workstation over the network backbone and stored at the website in a case table corresponding to the identification information. An assembled document is generated and sent to the user workstation. A docket having a critical date and a notification date is generated at the website and used to send a reminder and a corresponding assembled document to the user workstation over the network backbone from the website.

73 Claims, 5 Drawing Sheets

OTHER PUBLICATIONS

Lawyernet, Are You Online Yet? Your Colleagues are., Advertisement, Mar. 1996, p. 64, vol. 25, No. 3, The Colorado Lawyer.

Legal Systems, Inc., Save Time and Money with ProDoc, Advertisement, Mar. 1996, p. 63, vol. 25, No. 3, The Colorado Lawyer.

Think on Your Feet Inc., Colorado Trial Calculator, Advertisement, 1995, 3 pages, Littleton, CO.

Circle Reader Service, Unemploy a Lawyer. Get Smart Attorney, Advertisement, 1 Page.

Computerized Legal Forms, Inc. Computerized Legal Forms, Advertisement, 1 Page, Denver, Colorado.

Computerized Legal Forms, Inc. New Computerized Forms for Colorado Divorce, Advertisement, 1 Page, Denver, Colorado.

Lexis–Nexis, HotDocs Document Automation Software, Advertisement, 2 pages.

* cited by examiner

Fig. 4(a)

```
<CRT> COUNTY COURT                          <DN>
―――――――――――――――――――――――――――――――――――
<PLTFF>
V.
<DFDT>
                MOTION FOR SUMMARY JUDGMENT
―――――――――――――――――――――――――――――――――――
1.    (Insert Facts)

2.    (Insert Argument)........
                            Respectfully Submitted,

<P-ATTY>,#<P-ATTY-REG>
```

Fig. 4(b)

CASE TABLE

| User ID | JBULLDOG |
|---|---|
| ⋮ | |

| CASE ID | 10110/3A |
|---|---|
| CRT | Denver |
| DN | 99-10434 |
| PLTFF | John Doe |
| DFDT | Z-Corporation |
| P - Atty | J. Bulldog III |
| P - Atty - Reg | 198,769 |

Fig. 4(c)

```
DENVER COUNTY COURT                       99-10434
―――――――――――――――――――――――――――――――――――
John Doe
V.
Z-Corporation
                MOTION FOR SUMMARY JUDGMENT
―――――――――――――――――――――――――――――――――――
1.   (Insert Facts)

2.   (Insert Argument)........
                            Respectfully Submitted, J. Bulldog III, #198,769
```

ONLINE DOCUMENT ASSEMBLY AND DOCKETING METHOD

RELATED DISCLOSURE

This application relates to the U.S. Patent and Trademark Office Disclosure Document Program Filing No. 445079 filed on Sep. 24, 1998, entitled INTERNET LEGAL DOCUMENT ASSEMBLY AND DOCKETING SYSTEM.

BACKGROUND OF THE INVENTION

1. Field of the Invention

This application relates to methods for document assembly and docketing. More specifically, the present invention relates to on-line document assembly and docketing.

2. Statement of the Problem

Many businesses use form documents (i.e., documents having "boiler-plate" language that are subsequently filled in with task-specific language to produce a complete document). Form documents are popular with businesses. Computers allow form documents to be readily produced, edited, and transmitted or printed. Law firms (including corporate legal departments), real estate firms, and insurance companies often use form documents in litigation (e.g., Complaint, Answer, etc.), real estate closings (e.g., contract, inspection, appraisal, etc.), and claim handling (e.g., claim, inspection, appraisal, etc.), respectively. Litigation and other deadline-driven document production (e.g., worker compensation claim handling, real estate transactions, insurance claim handling, etc.) additionally require the firm to maintain a docket or calendar to record the date each document is due (i.e., filing date, response date, etc.).

Form documents are readily available in both printed and electronic form (e.g., ADOBE .pdf, Microsoft WORD, etc.). Similarly, legal document generating software is conventionally available (e.g., Corel HOTDOCS, etc.), as are software packages for maintaining a docket. However, the prior art does not provide an online method (i.e., an application server provider) for assembling a document and delivering over a computer network the assembled document corresponding to a calculated deadline recorded in a docket for specific cases.

A need exists to provide an online document assembly and docketing (or calendaring) method wherein the document and docket (or calendar) are tailored to the area of practice, jurisdiction, type of case, and attorney or agent.

A need also exists to deliver over a computer network an assembled document corresponding to a deadline recorded in a docket (or calendar).

A need also exists to permit a user to update case information (e.g., add a party, to change deadlines, etc.) and to update the docket to reflect changes.

A further need exists to preserve attorney work product and confidential information while working online.

SUMMARY OF INVENTION

1. Solution to the Problem.

The present invention provides a solution to the above problem by providing a method to calculate deadlines associated with a docket and assemble a document and deliver an assembled document corresponding to the deadline with a reminder over a computer network to a user workstation (i.e., using an application server provider). Hence, the incidence of malpractice is reduced (e.g., by having an independent source of procedural reminders and less opportunity for drafting errors), efficiency is increased, and the documents and docket are available for remote access. The assembled document and docket are tailored to the area of practice, jurisdiction, type of case, and attorney or agent. In addition, the user can update the case information (e.g., add a party, change deadlines, etc.) and update the docket to reflect changes to the proceedings. Preferably, the Internet and conventional web pages are used so that special software is not needed to use the method of the present invention. Additionally, attorney work product and confidential information is preserved while working online by transmitting only publicly available data and/or using encryption software.

2. Summary.

The present invention discloses an online document assembly and docketing method using a user workstation interconnected over a network backbone to a website (i.e., an application server provider). First, a new user is registered at the user workstation by receiving identification information at the website and storing the received identification information in a user table. Once registered, the user inputs identification information at the user workstation which is received at the website. In one embodiment, the user can update the identification information. Case data or information, including verification data, caption and certification data, and at least one trigger date is then received at the website from the user workstation over the network backbone and stored at the website in a case table corresponding to the identification information. An assembled document is generated by accessing a form document from the form table at the website and inserting the stored case data into a form document. Optionally the user can preview the assembled document at the user workstation. The assembled document is then delivered to the user workstation over the network backbone.

The present invention also discloses an online docketing and reminder method using the user workstation interconnected over the network backbone to the website. A docket having at least one critical date and a notification date is generated at the website and stored in the case table. At regular intervals, a computer system at the website automatically queries the notification field for the existing notification date and compares the existing notification date to today's date. A reminder is then generated when the existing notification date is today's date and sent with an assembled document to the user workstation over the network backbone from the website.

BRIEF DESCRIPTION OF THE DRAWINGS

FIG. 4(a) is an exemplary form document.

FIG. 4(b) is an exemplary case table having case information stored in fields therein.

FIG. 4(c) is an exemplary assembled document created using the form document of FIG. 4(a) and the case information stored in the case table of FIG. 4(b).

DETAILED DESCRIPTION OF THE INVENTION

1. Overview.

Figure 1:
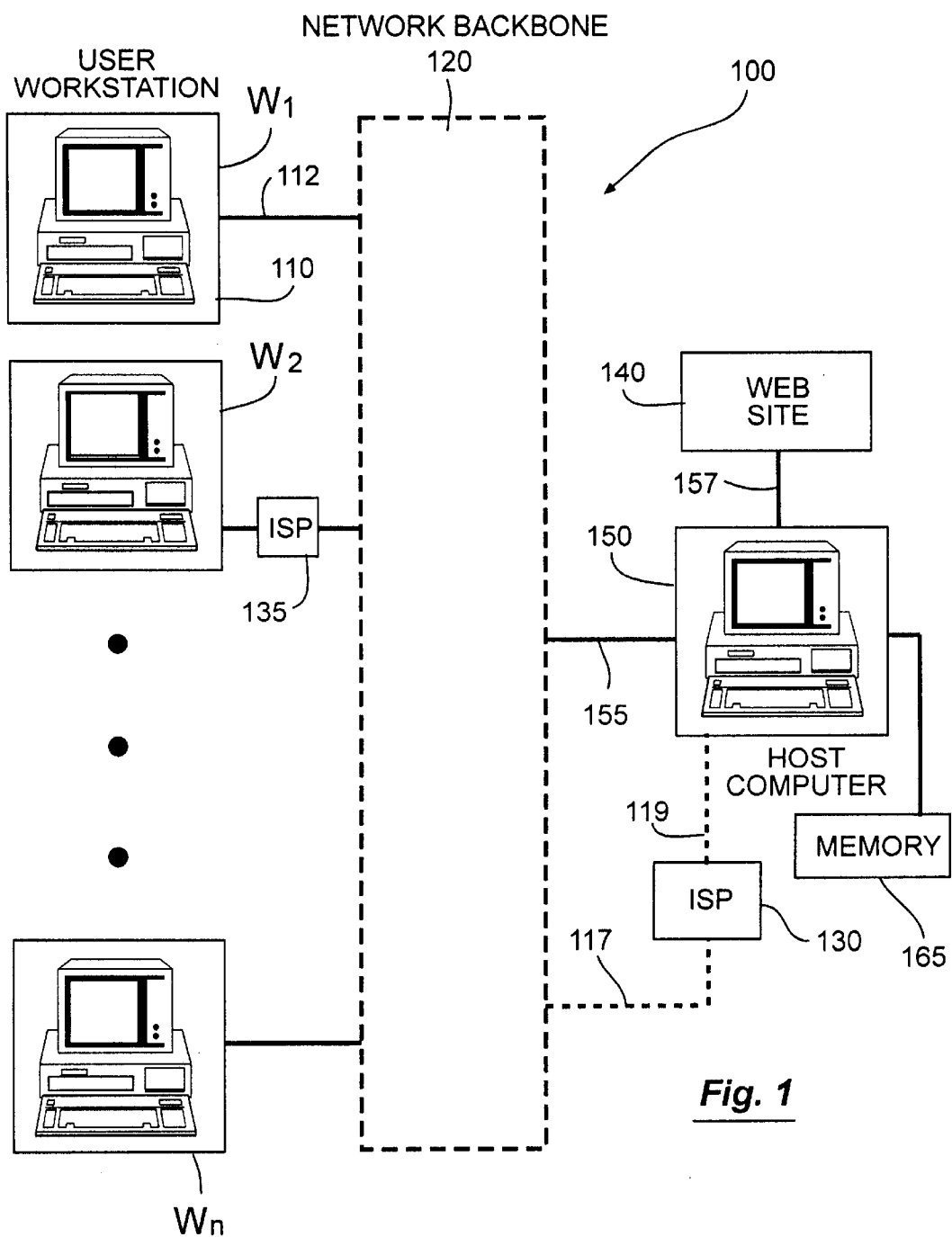
FIG. 1 is a block diagram of a communication system on which a method of the present invention is implemented.

The method of the present invention is implemented on a conventional computer network 100 (e.g., the Internet), such as that shown in FIG. 1. User workstations 110 are interconnected (e.g., over line 112 or through ISP 135) over a network backbone 120 to a host computer 150. The host computer 150 provides access to a website 140 and a memory 165 (i.e., an application server provider, or "on-line software"). The host computer 150 can be connected to the network backbone 120 either through a direct connection 155 or through an ISP 130 over lines 117, 119. The host computer 150 retrieves the requested website 140 and retrieves information input at the user workstation 110. The host computer 150 can also be used to update the website 140, and to permit administrator input/intervention, as explained in more detail below. In another embodiment, the host computer 150 is comprised of multiple computers conventionally networked so that one or more individual computers perform various functions (e.g., access the website 140, retrieve data input at the user workstation 110, maintain the docket, etc.).

As used herein, a user is defined as the operator of the user workstation 110. Typically, the user is an attorney or member of the law firm staff, however, the website 140 may be made available to members of the public at large (e.g., for pro se proceedings). In another embodiment, the user workstation 110 can be programmed to automatically access the website 140 (i.e., through the host computer 150) and conduct the transactions therebetween. Furthermore, a new user is defined as an unregistered user, or a user for which no corresponding user information (e.g., username and password, billing information, etc.) is stored at the website 140 (i.e., by the host computer 150 in memory 165). Hence, a registered user is defined as a user for which corresponding user information is stored at the website 140. The administrator is defined as the operator of the host computer 150. The administrator updates and maintains the website 140 and tables, and in other embodiments can send email to the user workstation 110 or provide technical support to the user. All or part of the administrator's functions can be programmed to be automatically carried out by the host computer 150.

It is to be expressly understood that any suitable computer network 100 can be used under the teachings of the present invention. For example, the network backbone 120 can be any land-based, satellite-based, direct cable (e.g., DSL, LAN) network, or any combination thereof. Likewise, any number of user workstations 110 (e.g., W1, W2, ... Wn) can be connected over the network backbone 120 to the website 140. Likewise in another embodiment, the administrator can access the host computer 150 over an internal network 157 (e.g., an intranet) or over the network backbone 120. The individual locations of workstations 110 are immaterial to the teachings of the present invention.

It is to be understood that each workstation 110 and host computer 150 can have individual internal memory 165. Likewise, internal memory 165 can be random access memory (RAM), read only memory (ROM), any suitable form of storage disk (e.g., magnetic tape, hard disk, floppy disk, ZIP disk, etc.), or any combination thereof. Furthermore, the memory 165 can be a single memory or separate memories, and can reside within the host computer 150 or independently thereof so long as the website 140, via the host computer 150, has access to the memory 165. In fact, in a preferred embodiment, the workstations 110, and host computer 150 are conventionally available as PENTIUM-based personal computers having modems or other communication paths.

It is also important to understand that any number of user workstations 110 can be interconnected over the network backbone 120 to access the website 140 at any time of day or night including multiple accesses by different users at the same time.

2. Tables.

FIGS. 2(a)–(c) are exemplary of tables or records stored in memory 165 and accessed by the host computer 150 that can be used with the method of the present invention. Preferably there is a single user table 200, a single case table 230, and a single forms table 270. In such an embodiment, the identity of each user is associated with the user's password and other user information described below, all of which is stored in a single user table 200. Similarly, all cases are stored in a single case table 230 and the identity of the user and case are associated, grouped, or otherwise linked with the appropriate case information, docket, etc. For example, a single row or a single column in a conventional spreadsheet can be used to group all of the case information, docket, etc. for a specific case. In some embodiments, the term "field" may be used to describe such a grouping. Likewise, each form document is stored in a single forms table (e.g., grouped by the area of practice). In another preferred embodiment, the forms are instead stored in a folder (not shown). In yet another embodiment, there are multiple tables of each type (e.g., multiple user tables) with each type of table being stored together in a single database (not shown). For instance, a separate user table can be used for each state, or a separate user table can be created for each user, and each of these tables stored in a single user database (not shown). Similarly, a separate case table can be created for each case and for each user, and each of these case tables stored in a single case database (not shown). Alternately, a separate database can be created for each user, and thus a single user database will contain the user table of a single user and each case table for that same user. Likewise, the forms table can either be in a separate database, combined with other databases, or further subdivided based on the subject matter (e.g., divorce, civil litigation, insurance, etc.). The creation, modification, and use of folders, tables, and databases such as these is conventional and often will depend on the software used to create and manage the data (e.g., Microsoft FRONTPAGE, ACCESS, or SQL). Other arrangements will be apparent to those skilled in the art and can be varied for reasons of storage, efficiency, available software, etc. It is to be expressly understood that the present invention is not to be limited by the arrangement of data in memory 165.

More particularly, a user table 200 is shown in FIG. 2(a). The user table 200 contains a user identification (ID) field 210, a password field 215, and a user information field 220. Each field is preferably grouped with the associated user ID so that multiple user accounts can be maintained in a single user table 200, as described above. The user ID field 210 and password field 215 are conventionally a login identification (e.g., the name of the user) and password (either chosen by the user or computer generated), respectively. The user information field 220 stores information about the user and can include, for example, an attorney registration number, the billing address of the user, the type of account (e.g., fixed fee or hourly, etc.), areas of practice, and any other information required to sufficiently identify the user. Other user fields 225 (e.g., Field i) can also be stored in the user table

200 and can be used to store information about the user such as law firm identification, date of most recent access, names of authorized users, etc.

Figure 2:
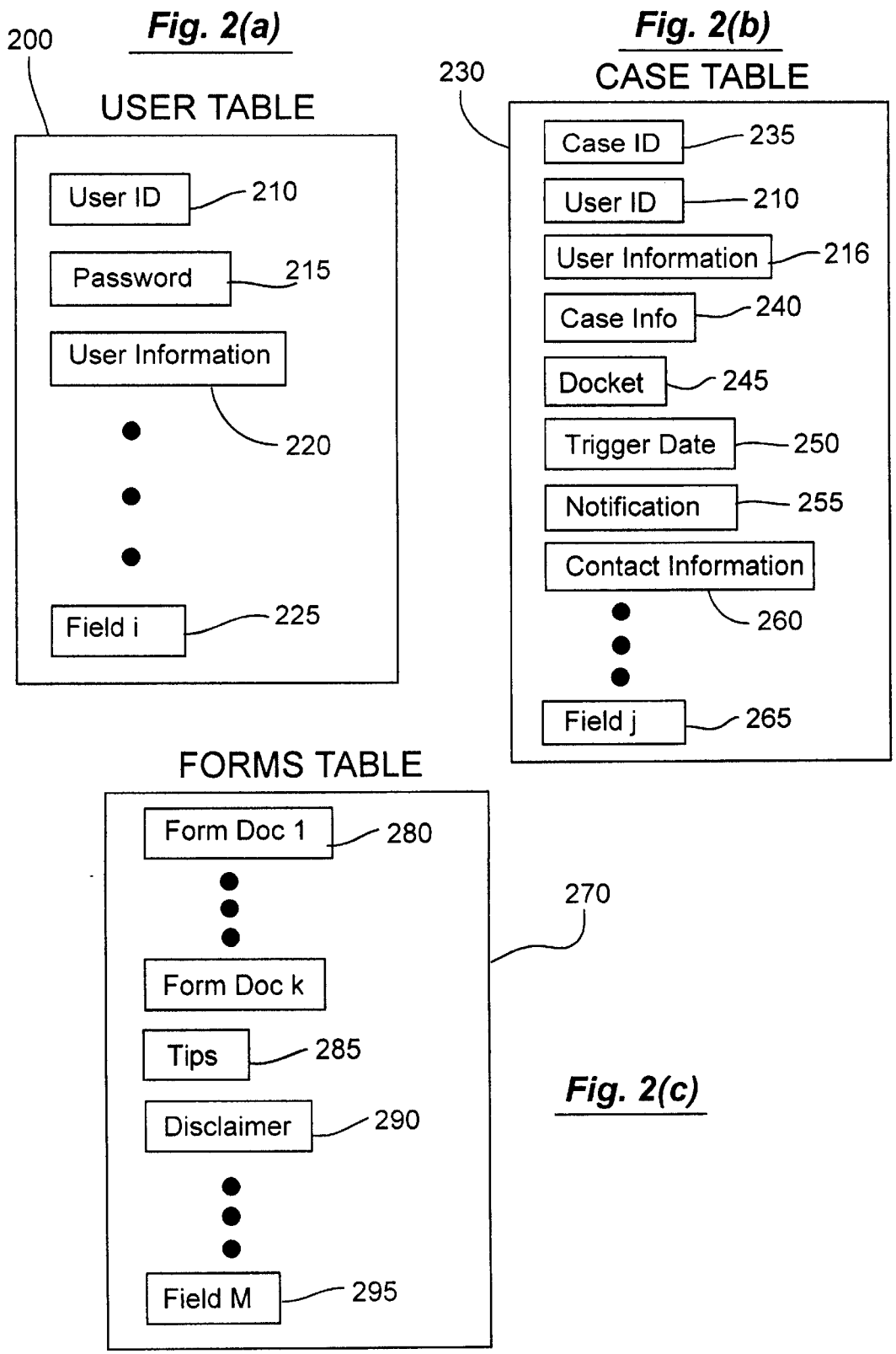
FIGS. 2(a)–(c) are block diagrams of (a) a user table, (b) a case table, and (c) a forms table, each for use with the online document assembly and docketing method of the present invention.

A case table 230 is shown in FIG. 2(*b*). In a preferred embodiment, the case table 230 contains a case identification (ID) field 235, a case information field 240, a docket field 245, a trigger date field 250, a notification field 255, and a contact information field 260. The case information field 240 contains a case identification or ID (e.g., the attorney docket number, or a computer generated identification), and can also include general information about the case and parties, for example, the caption (e.g., plaintiff and defendant names), party addresses, court, type of case (e.g., personal injury, divorce, criminal), etc. Again, in a preferred embodiment, each field is appropriately grouped with the associated case ID 235. In addition, information relevant to a claim acknowledgement document or request for medical records can be stored in the case information field 240, or information relevant to a real estate contract, appraisals, or loan applications, can be stored using a version of the present invention adapted for use by insurance companies or real estate firms, respectively.

A cross-reference or link to the user ID field 210 can also be stored in the case table 230. For example, in an embodiment where the case ID 235 is based on an internal docket number for a law firm, cases will be distinguished among users based first on the user ID 210, then the case ID 235. In another embodiment, the user ID field 210 in the case table 230 can be distinct from the user ID field 210 in the user table 200. Such an embodiment permits the user ID 210 to be modified for a specific case. For example, the user ID field 210 stored in the user table 200 can be a law firm ID and password, while the user ID field 210 stored in the case table 230 is the responsible attorney ID and password. In yet another embodiment, where the administrator assigns individual docket numbers or case IDs to each case, the user ID does not need to be cross-linked to the case table 230.

Preferably, a separate user information field 216 (i.e., separate from user information field 215 in the user table 200) is maintained in the case table. As such, the user information (e.g., co-counsel, responsible attorney, type of billing, etc.) can be modified for a specific case, while maintaining the general user information in the user table 200. For example, a law firm may have an established account, which is stored in the user information field 220. However, the user can modify this information to include co-counsel, for instance. Co-counsel is only working on the specific case with the user, and therefore the user does not want to change the information stored in field 220 for all the user's other cases. However, the user will want to modify the information with respect to that specific case (i.e., add co-counsel) so that the modified information appears only in documents related to that specific case. In addition, appeals based on that same specific case will include the modified information (i.e., co-counsel), while the user's other cases will be unaffected by the modified user information. Alternatively, a cross-reference or link to the user information field 220 can be used where the user information is not to be separately modified. In yet another embodiment, the user information need not be present in the case table at all.

The docket field 245 contains a docket or deadline chart that lists the events and associated deadlines and is generated for a given case ID 235. The trigger date field 250 contains a trigger date. For example in a personal injury action, if an Answer must be filed with the court 30 days after service of the Complaint, the date the Complaint is served is the trigger date for filing the Answer (i.e., the Answer must be filed 30 days after the trigger date). The notification field 255 contains a notification date. The notification date can be either a critical date (i.e., the date the Answer must be filed) or several days in advance of the critical date. For example, if the Complaint was served on June 1 and the jurisdiction requires an Answer to be filed within 30 days of the service date, the trigger date is June 1, the critical date is thus June 30, and the notification date is June 30 or earlier (e.g., June 25) to allow for advance warning. It is to be expressly understood that more than one trigger date can be stored with corresponding notification dates, and the use of the trigger date and notification date will be explained more fully below in reference to the method of the present invention. Other case fields 265 (e.g., Field j) can be used to store additional information about the case, such as opposing counsel's address, rules of procedure, user comments, etc.

A forms table 270 is shown in FIG. 2(*c*). In a preferred embodiment, the forms table 270 contains form document fields 280. Form document fields 280 store form documents (e.g., a Complaint, an Answer, a Motion for Summary Judgment, Interrogatories, etc.).

The form documents preferably are formatted for various jurisdictions and types of cases, and contain fields or links so that the court, caption, attorney address, etc. input at the user workstation 110 are automatically entered into the form documents where appropriate to generate assembled documents, as explained in more detail below with respect to FIG. 4. The form document can also include sample or instructional text (e.g., <insert first interrogatory here> or <insert first ground of complaint here>). Preferably, the form documents are formatted in conventionally available word processor formats (e.g., Microsoft WORD, Corel WORDPERFECT, rich text format, ASCII text, etc.) so that the form documents can be readily edited by the user for a specific case. It is to be understood that any number of form document fields 280 can be used and will be limited only by the various documents necessary for a given case. Alternately, a single field may contain all forms required for a personal injury action, while a separate field 280 will contain all forms required for a divorce proceeding, etc.

A form document, as used herein, is defined as a pre-prepared, generic document preferably having form fields so that task specific data can automatically be input therein. Form documents are generic in that no task specific data is included, but text common to any similar document is included. This format also maintains the integrity of attorney work product and attorney-client confidences, as discussed in more detail below.

An assembled document, as used herein, is defined as a form document that has been combined with specific task data (e.g., party names). Preferably, the assembled document does not contain specific text (e.g., the argument or complaint), as this information is preferably added later by the user at the user workstation 110. The assembled document is the document downloaded or otherwise transmitted to the user workstation 110 from the website 140 (i.e., the host computer 150) and can be edited, stored, retransmitted, printed, displayed, etc. by the user at the user workstation 110.

Preferably, the forms table 270 also contains a tips field 285, a disclaimer field 290, and can also contain any other form language field 295 (field M) (e.g., payment policies, local rules of procedure, etc.). The tips field 285 contains "boiler-plate" language of relevant practice tips. Likewise, the disclaimer field 290 contains "boiler-plate" disclaimer language such as warranties or disclaimers thereof, warning of varying jurisdictional requirements, stating that the website does not substitute for legal advice, etc.

It is to be expressly understood that the user table 200, case table 230, and forms table 270 can be separate records stored in a single memory 165 or combined into one or more tables. For example, a separate table may be used for each user, for each case, etc. Likewise, the fields may be combined into single records or each table can be stored in a separate memory. The present invention is not to be limited by the arrangement or use of the tables, and the arrangement shown in FIGS. 2(a)–(c) is only intended to be exemplary.

3. Document Assembly and Docketing Method.

Figure 3:
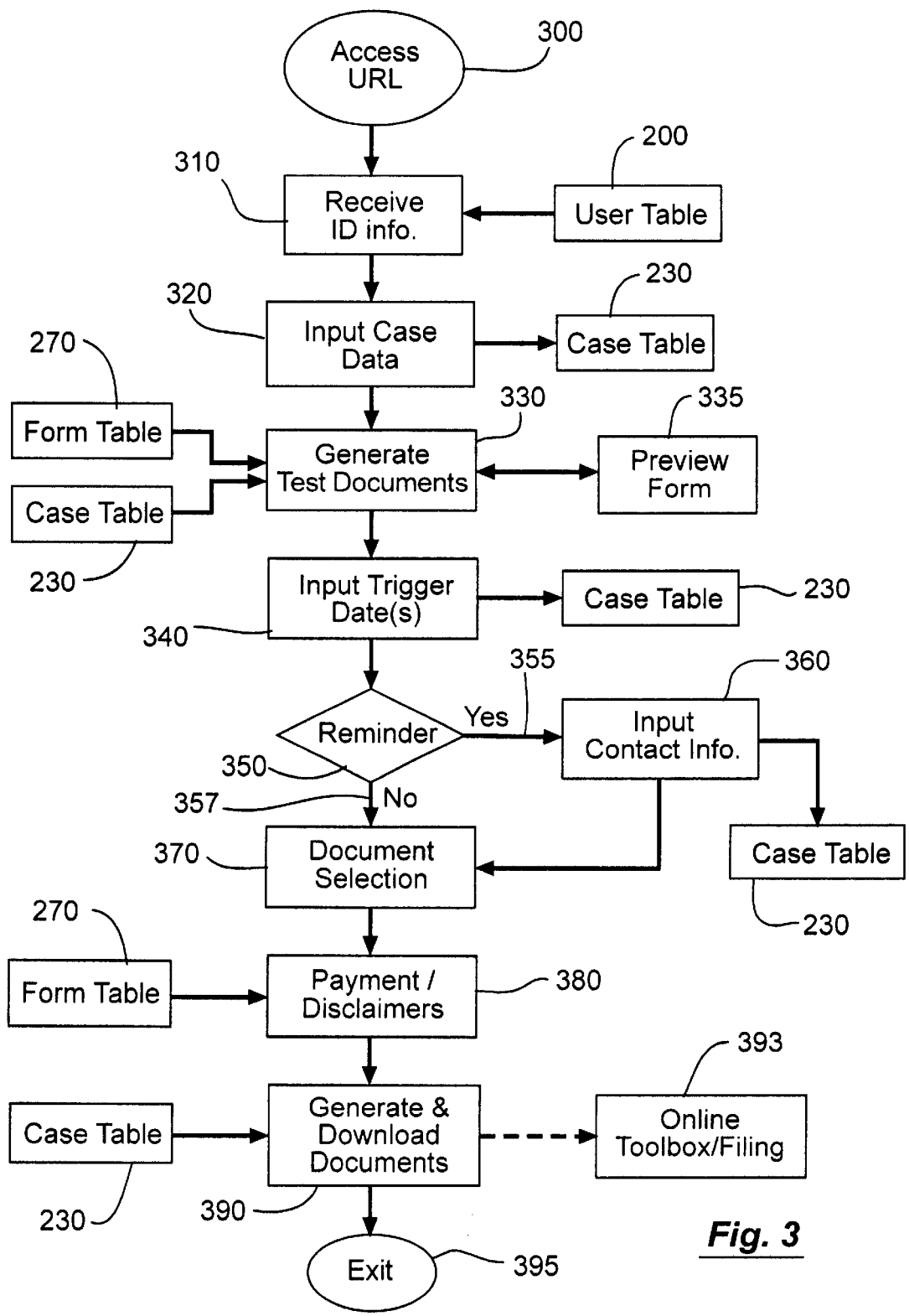
FIG. 3 sets forth a flow chart of a method of the present invention for assembling documents and generating a docket.

FIG. 3 sets forth a flow chart of the method of the present invention in which an assembled document is generated and an election is made whether the user is to receive a reminder corresponding to the docket. In stage 300, the process is started by the user accessing the website 140. Accessing the website 140 from the user workstation 110 over the network backbone 120 such as the Internet is conventional and well known and typically involves accessing a domain name (e.g., www.<domain name>.com).

Upon accessing the website 140, the user workstation will be prompted with a presentation requesting a login identification such as a user ID (i.e., a unique identification string or username such as a combination of state of practice and the attorney registration number) and a password that have been previously assigned. For example, the following can be displayed at the user workstation 110:

Enter Username:

Enter Password:

The identification information input at the user workstation 110 in response to the prompt is received at the website 140 and verified (e.g., by the host computer 150) with identification information stored in the user table 200. In the event a user ID has not been previously assigned (i.e., the user is a new user), the new user will be given the option to register at the website 140. Registration is conventional and typically involves prompting the user workstation 110 for identification information (e.g., attorney registration number, state of registration, name, firm, billing address, payment method, contact information, etc.) and assigning a user ID and password (either computer generated or user selected), account number, etc., corresponding to the identification information. That is, the identification information is stored in the user table 200 in the appropriate fields 210, 215, 220.

Once registered, the user (i.e., a registered user) inputs the username and password in stage 310 (e.g., by typing on a keyboard at the user workstation 110). Preferably for legal applications, the username for a registered user is the attorney registration number and state of registration. Further access to the website 140 is permitted in step 310 only after the website 140 has received the user ID and corresponding password and the host computer 150 has verified that the user is indeed a registered user.

In a preferred embodiment, once the user is verified as a registered user, the host computer 150 will display (either automatically or at the request of the user) the user information at the user workstation 110 and permit the user to edit the displayed user information by inputting changes at the user workstation 110 and submitting these changes to the website 140. The host computer 150 then stores the edited user information in the appropriate fields of the user table 200.

Verifying that the user is a registered user is done conventionally. That is, the user ID and password are delivered over the network backbone 120 to the website 140 and the host computer 150 makes a determination of correctness (e.g., whether it matches that of a registered user). If the identification information is not correct, the host computer 150 informs the user workstation 110 over network backbone 120 that the identification information is incorrect and requests re-entry at the user workstation 110. Preferably only a predetermined number of incorrect attempts are permitted before the user workstation 110 is disconnected from the website 140.

In one embodiment, the method of the present invention can be accessed by multiple users under an umbrella account. For example, a law firm may purchase an umbrella account for the firm, and each attorney would have a separate user identification and optionally individual password. For example:

law firm (username, password)
    lawyer 1 (username, password)
    lawyer 2 (username, password) . . .
    lawyer n (username, password)

Alternatively, a group ID and group password preferably including the state(s) and area(s) of practice are used allowing for group discounts, group billing, promotions tailored to specific groups, etc.

In any event, once the user has gained access to the website 140 in steps 300 and 310, the website 140 (i.e., with host computer 150) in step 320 prompts the user at the user workstation 110 for case data or information in a presentation such as:

Enter Case ID:

Enter Defendant Name:

Enter Plaintiff Name:

Enter Jurisdiction:

Enter Court Docket No.:

Type of Case:

It is to be expressly understood that any suitable case data can be prompted and input during stage 320, but preferably includes at least the case data sufficient to produce a document caption (e.g., for a legal document, the parties, court of jurisdiction, and docket number, if any), signature block and mailing certificate (e.g., law firm, attorney, mailing address). Likewise, the website 140 can prompt the user workstation 110 for case data in any order and in distinct blocks (e.g., case ID, then parties, then jurisdiction, etc.).

In a preferred embodiment, the website 140 first prompts the user workstation 110 for the case ID In this manner, the host computer 150 can then access the case table 230 and determine whether case information corresponding to the input case ID was previously stored.

If case information is already stored corresponding to the input case ID, the stored case information is displayed at the user workstation 110 and can be edited and updated by the user. If case information was not previously stored corresponding to the input case ID, the website 140 prompts the user workstation 110 to input new case information corresponding to the new case ID Preferably, the host computer 150 will also assign an internal user ID and case ID corresponding to each user for additional processing and record-keeping purposes. Any case data that is received by the website 140 (e.g., "John Doe" in response to the "Enter Defendant Name" prompt) is stored during stage 320 in the case table 230 (e.g., in field 240) corresponding to the case identification.

In a preferred embodiment, the user workstation 110 is also prompted by the host computer 150 to select whether the user represents the plaintiff or defendant (buyer or seller, etc.). This selection can then be used by the host computer 150 to determine which form documents are required for the user's case (e.g., an Answer instead of a Complaint if the user represents the defendant), in addition to other party-specific functions. Similarly, where relevant to the docket, information such as the "at issue" date, expert witness discovery date, trial date, and whether service was made in-state or out-of-state, whether a filing with the court was made, and other events relevant to the trigger date can be recorded and used by the host computer 150 to determine, for example, which additional documents will be necessary or any effect such events may have on the determination of a critical date.

Once the case data (either initially or as changed) has been received at the website 140 in step 320 and stored in the case table 230, test documents are generated in stage 330. In stage 330, the case data is accessed from the case table 230 and combined with a form document from the form table 270 to generate a test document. Using data that is stored in fields to fill corresponding form-fields in a form document is conventional and is explained in more detail below with reference to FIG. 4. It is to be expressly understood that the host computer 150 can generate each assembled document from the form documents required for the entire proceeding (e.g., Complaint through Jury Instructions) during stage 330 and store the assembled documents in the case table 230, generate only the assembled documents selected by the user in step 370, generate the assembled document to be delivered to the user workstation 110 with the reminder (as discussed below), only generate test documents, or any combination thereof.

Optionally, in step 335, the website 140 can prompt the user workstation 110 with the option to preview an assembled document. Preview routines are conventional and typically allow the user to view a document (e.g., the assembled document) on-screen as it will appear once printed on paper.

In a preferred embodiment, any test documents or assembled documents that were generated during the user access are deleted from memory when the user logs off and regenerated each time the case is accessed. The assembled document or test document will be regenerated using the latest case data stored in the case database. Hence, simply accessing the case will produce an assembled document with an "old" heading. To generate an assembled document with "new" or updated case data, the user will first have to make the requisite changes to the case table 230.

In step 340, the user workstation 110 is prompted to input the trigger date (e.g., the date the complaint was served). In one embodiment, this information can be requested when the user workstation 110 is prompted to input case data in step 320. Alternately, the trigger date can be prompted in a separate step. In any event, the trigger date, or dates if there are more than one relevant trigger date, received at the host computer 150 from the user workstation 110 are stored in the trigger date field 250 of the case table 230. Preferably, the user is "forced" to fill in all critical dates (i.e., prompts or blanks) for each case before proceeding, thus avoiding mistakes or insufficient input.

The host computer 150 then uses the trigger date to generate a docket using an appropriate algorithm based on the trigger date and jurisdictional or statutory rules, agreements between the parties, court orders, etc. Optionally at this point, the user can select hyperlinks to procedural definitions or additional information (e.g., related procedural rules).

An example in the Federal District Court of Colorado where a complaint was served on May 1, 1999 is shown in Table I below:

TABLE I

| Event | Algorithm | Critical Date |
|---|---|---|
| Complaint Served | Trigger Date = May 1, 1999 | May 1, 1999 |
| Motion for Extension of Time | Extension = <NONE> | NA |
| Answer to Complaint and Counter-Claims Filed | Formula 1 | {May 21, 1999} |
| Reply to Counter-Claims | Formula 2 | {June 10, 1999} |
| Jury Demand | Formula 3 | {June 20, 1999} |

In the example shown in Table I, the user has input "May 1, 1999" as the date the complaint was served (i.e., Trigger Date). The host computer 150 receives this information from the user workstation 110 and automatically generates a list of critical dates for all other documents that must be filed or served based on the procedural rules of the selected or input jurisdiction. Thus, as shown in Table I, the host computer 150 uses Formula 1 to determine the critical date for filing the Answer to Complaint and Counter-Claims.

$$\text{Trigger Date} + P_1 + E \qquad \text{Formula 1:}$$

Where:

Trigger Date=user input;

$P_1$=days to answer according to applicable procedural rules; and

E=any applicable extensions of time

In the example shown in Table I, the trigger date is May 1, 1999, P is 20 days according to the Federal Rules of Civil Procedure (FRCP) applicable to the Tenth Circuit District Court of Colorado, and E is zero (i.e., no motion has been granted in this example). The host computer 150 preferably displays the list of critical dates (i.e., a preliminary docket) at the user workstation 110. Some critical dates are only tentative (e.g., indicated by the brackets {} in Table I) since a Motion for Extension of Time or other event (e.g., a court order, party stipulation, party action such as filing before the critical date, etc.) can change the actual critical date. Tentative dates preferably are not displayed at the user workstation 110. Similarly, critical dates for unknown dates, such as the trial date, can be left blank, omitted from the docket altogether, or otherwise appropriately denoted.

Formula 2 in the example shown in Table I can be expressed as follows:

$$CD_A + P_2 + M_1 \qquad \text{Formula 2:}$$

Where:

$CD_A$=date Answer is served (i.e., Critical Date of Answer); and $P_2$=days to reply to counterclaims according to applicable procedural rules $M_1$=whether deadline is affected by method of service under the applicable rules (e.g., hand-delivery or U.S. Mail)

Thus, the Reply, if any, is due 20 days ($P_2$=20 days, per FRCP) after filing the Answer and Counter-claims. This too can be denoted by brackets {}, or other suitable notation, as being tentative. Formula 3 is then used to determine the critical date for filing a Jury Demand:

$$L + P_3 \qquad \text{Formula 3:}$$

Where:
L=Date last pleading filed; and
P₃=days to make jury demand according to applicable procedural rules Hence, the Jury Demand is due 10 days ($P_3=10$ days, per FRCP) after the last pleading is filed.

In one embodiment, the host computer 150 can use the date the reply was filed (e.g., as a default) to determine L, the date the last pleading was filed. Preferably the default dates are not shown to the user and instead are left blank to reduce any misperception by the user as to the actual critical date. However, the default date can be used by the host computer 150 to send a reminder in the event the user fails to update the docket.

In the event the last pleading filed is the Answer (e.g., no counter-claims were filed) or the last pleading is filed before the critical date or otherwise altered (e.g., party stipulation, court order, etc.), the preferred embodiment permits the user to manually update the critical date in the listing (e.g., by inputting the actual critical date at the user workstation 110 and transmitting the changes to the host computer 150) to reflect the actual critical date. Allowing the user to make such corrections to the docket is important so that subsequent dates are accurately determined using the appropriate algorithms. Preferably, each time a change is made to the docket, an updated docket or a deadline chart (i.e., including the activity or event, procedural rule, and deadline date) reflecting changes to future deadlines is sent to the user at the user workstation 110.

In a preferred embodiment, the user is unable to change at least one trigger date (e.g., the date the complaint was served). As such, the user is prevented from using the same case ID for multiple cases. In other words, the user is prevented from establishing and paying for a single case, yet using the same case (i.e., using the same case ID) repeatedly, having only paid for a single use. However, in some situations (e.g., the date of service was input incorrectly), the user can contact the administrator by email, telephone, etc. and at the administrator's discretion, the administrator can manually override and correct the trigger date.

A second example is given in Table II, in which a three day extension of time was granted in which to file an Answer.

TABLE II

| Event | Algorithm | Critical Date |
|---|---|---|
| Complaint Served | Trigger Date 1 = May 1, 1999 | May 1, 1999 |
| Motion for Extension of Time | Extension = 3 days | NA |
| Answer to Complaint and Counter-Claims Filed | Formula 1 | {May 24, 1999} |
| Reply to Counter-Claims | Formula 2 | {June 13, 1999} |
| Jury Demand | Formula 3 | {June 23, 1999} |

The three day extension (E=3 in Formula 1) changes the critical date for filing an Answer to May 24, 1999 in Table II, and hence the default critical dates for filing the Reply and Jury Demand are also updated to reflect the three day extension, although these still remain tentative, as indicated by the brackets {} for the reasons discussed above.

In a preferred embodiment, the method of the present invention automatically adjusts (i.e., using an appropriate algorithm or calendering routine) the critical date and notification date for recognized holidays and weekends. Also in a preferred embodiment, the method of the present invention notifies the user of the opposing party's critical dates. For example, the host computer can send a reminder to the user that on May 24, 1999 (Table II), the opposing party should have filed an Answer. The reminder can include a recommendation that the user check that an Answer or Motion for Extension of Time was indeed filed, and that in the event that the appropriate action was not taken by opposing counsel, the reminder can further inform the user of available options such as filing the appropriate motion (e.g., for default judgment, sanctions, etc.). Such a reminder is discussed in further detail below with respect to the reminder method of the present invention.

It is to be expressly understood that the events, formulas and algorithms, and dates given with respect to the example of Tables I and II are merely intended to be exemplary and are not intended to limit the scope of the present invention. Indeed, any suitable algorithm can be used and can include much more sophisticated algorithms than those presented above. Likewise, the list of events can be complete (i.e., through trial) or broken into distinct portions (e.g., pleadings, discovery, trial, etc.).

In a preferred embodiment, the user can tailor the docket to include additional appointments, such as a deposition, an appointment with a medical/health professional or other expert witness, pretrial conferences, plea bargaining conferences, court orders, etc. The host computer 150 displays pull-down document lists with predetermined events (e.g., Court Order) or text entry blocks for user selected events at the user workstation 110. Preferably the user can associate the critical date and/or notification date with the user specified event by selecting an appropriate algorithm (e.g., similar to those used with spreadsheets), using conventional calendar software, or simply inputting the critical date.

In a preferred embodiment, the host computer 150 will also determine the notification date in step 340 and include the notification date as part of the generated docket. The notification date can be a predetermined or user selected advanced warning (e.g., five days before the critical date). Alternatively, the notification date can be the critical date in which case no advance warning is given. A docket based on Table II and an advance warning of five days is given as an example in Table III:

TABLE III

| Event | Critical Date | Notification Date |
|---|---|---|
| Complaint Served | June 1, 1999 | NA |
| File Answer | Jul. 1, 1999 | June 25, 1999 |
| Set Trial Date | Jul. 15, 1999 | Jul. 10, 1999 |

It is to be expressly understood that the reminder can be sent both on the notification date and the critical date, or only on the notification date. In addition, in one embodiment, the user is given the option to print, view, or download the docket. In another embodiment, the docket is not released to the user and is used strictly by the host computer 150 to send reminders and the corresponding dockets, as explained in more detail below. In yet another embodiment, the docket can be synchronized with an Internet or PC-based calendar (e.g., MICROSOFT OUTLOOK) so that the attorney's calendar is automatically updated based on the generated docket.

In step 350 the user is prompted by the host computer 150 to select whether reminders are to be sent to the user workstation 110. Reminders (e.g., email messages) can be sent to the user workstation 110 from the host computer 150 on the notification date to remind the user of a pending critical date based on the docket generated from the trigger date. Reminders are explained in more detail with reference to FIG. 5 below. If reminders are selected, the host computer 150 proceeds 355 to request contact information (e.g., email addresses, phone numbers, etc.) from the user so that the reminder can be sent to the user workstation 110, to the user directly, or to the user at another user workstation 110 (e.g., W2). The contact information is stored in the contact information field 260 in the case table 230.

Although in the preferred embodiment, reminders are email messages, other reminders can be used under the teachings of the present invention, including telephone messages (prerecorded or live), pager messages, faxes, a personalized user homepage displaying upcoming deadlines (e.g., each time the user logs on to the web site 140 or in an "always on" mode, for example, where the user is constantly connected to the web site 140 and the web site 140 including any reminders are continually updated), etc. In addition, the method of the present invention also includes an affirmative acknowledgement of the reminder by the user, as discussed in more detail below with respect to the docketing and reminder method of FIG. 5. Optionally, information regarding the affirmative acknowledgement (e.g., alternate email addresses, alternate phone, fax or pager numbers, etc.) can also be retrieved by the host computer 150 in stage 350.

After determining that either the email option is not selected 357 or after the host computer 150 has received the contact information in step 360, the routine proceeds to step 370. In step 370, the user workstation is prompted for document selection. That is, the user can select which of the assembled documents to download from the website 140 to the user workstation 110 for further editing and printing. For example, the user workstation 110 can be prompted with:

Complaint
Motion for Extension of Time
Answer
Answer and Counter-Claim
Reply to Counter-Claim
Jury Demand The user then makes a selection of the documents to be downloaded or otherwise viewed. In one embodiment, various packages can be offered (e.g., a commencement package, an at issue package, a trial package, etc.). Selection is conventional and typically involves "checking" the box next to the desired document (or clicking a hypertext link) using a mouse at the user workstation 110 and submitting this request to the website 140.

In another embodiment, the user does not select assembled documents for immediate download and instead, an assembled document is delivered to the user workstation 110 (e.g., as an attachment to an email) corresponding to the reminder (e.g., the Answer is delivered on June 25 in the example of Table III, above). In yet another embodiment, the user can select which documents to download immediately and which documents are to be sent with the reminder. Alternatively, the user can select assembled documents to download to preliminarily review and also have the assembled documents sent with the reminder (e.g., in case the downloaded document is later lost or destroyed).

In the preferred embodiment, the computer system next proceeds to step 380 for payment and to display disclaimers. Any conventionally available payment method can be used under the teachings of the present invention. For example, the user can pay for a yearly subscription, on a per document, per access, per reminder, or per time interval basis, etc. Prices for various packages and/or documents can be displayed by the website 140 at the user workstation 110.

In one embodiment, where the user has a payment agreement with the administrator, the host computer 150 records access by the user workstation 110 to the website 140 in the user information field 220 or other Field i in the user table 200. The administrator can use this information to determine the required payment and send the user a bill (e.g., a monthly bill).

In another embodiment where the user has an annual subscription or other fixed fee agreement, the host computer 150 need not record the user's access to determine the required payment. Alternately, the host computer 150 can request advance payment (e.g., in the form of a credit or debit card). The host computer 150 receives the payment information (e.g., credit card number and expiration date) and gets approval from the appropriate credit or debit source (or verifies that there is an existing payment agreement with the administrator) using conventionally available software before downloading the selected assembled documents to the user workstation.

Also in step 380, the host computer 150 transmits any disclaimers over the network backbone 120 to be displayed at the user workstation 110. The disclaimers can be boilerplate language stored in the disclaimer field 290 of the forms table and can include, for example, warranty disclaimers, warnings to seek the advice of an attorney, etc., or even practice tips, notices of recent changes to the rules of civil procedure or evidence, notices of recent court decisions, etc.

Once payment is approved, the selected documents, if any, are retrieved from the case table 230 (if already generated) or generated using the form table 270 and case information stored in the case table 230 and downloaded or otherwise delivered in step 390 from the website 140 (i.e., the host computer 150) to the user workstation 110 over the network backbone 120.

Optionally, in step 393, the user workstation 110 is prompted to choose an online toolbox and/or online filing. The online toolbox allows the user to save the assembled documents, letters, and images (e.g., exhibits, photographs, etc.) at the host computer 150, maintain an online "to-do" list, list of contacts, calendar, document index, etc. all related to a particular case. Thus, the online toolbox provides the user with online or centralized case management. In other words the user and/or the user's support staff can access all documents, images, etc. related to a specific case from any location (e.g., remote access from a laptop computer or PALM PILOT). Hence, the user can review, update, download and print, and/or file remotely.

For example, the user can access the online toolbox for a particular case (Case 1) while out of town and update the Motion for Summary Judgment. Another attorney at the user's office can later access the same Motion for Summary Judgment for Case 1, download a copy, and file it with the court. Hence, the user is assured that each document, image, etc. accessed from the online toolbox is the most recent and reflects all the changes the user and/or the user's support staff have made. Furthermore, the user need not transfer each document to each user workstation 110 (e.g., the user's desktop computer at the user's office, the user's laptop computer for remote access, etc.). This is particularly advantageous for smaller, handheld computers that have limited disk storage.

The user can also choose to file documents online with the appropriate court, agency, etc. in step 393. Electronic document filing is conventionally available for court systems (e.g., electronic filing provided by JusticeLink, Inc., Dallas, Tex.). Such systems permit electronic documents (e.g., pleadings) to be electronically transmitted to the court (e.g., through the network backbone 120 in a manner similar to that described with respect to the present invention) and printed or otherwise recorded by the court clerk. Optionally, an acknowledgement can be sent from the court clerk to the filing attorney.

Thus, when a user selects the online filing option, assembled documents can be viewed at the user workstation 110, edited, and filed online through a link provided at the host computer 150. Optionally, signature verification can be maintained at the host computer 150, and the filing fee can be billed through the user's fee agreement with the application service provider or administrator as a single transaction. Alternately, the files can be downloaded and filed electronically by the user directly from the user workstation 110, using links provided at the website 140.

The host computer 150 then exits the routine in step 395, preferably by transmitting an "end-of-session" display to the user workstation 110.

In a preferred embodiment, the website 140 also displays at the user workstation 110 descriptions of the assembled documents available for download, including a price if applicable. Similarly, practice tips, hyperlinks to related websites, advertisements, etc., can all be displayed at the user workstation 110 by the website 140. In addition, a free trial document can be made available for downloading (e.g., such as that generated in step 330).

It is to be expressly understood that while the flow chart of FIG. 3 is the preferred operation, variations could occur and that the precise ordering of some of the stages can be varied or various steps can be omitted in other embodiments within the teachings of the present invention. For example, document generation 330 and/or document selection 370 can occur immediately before downloading in step 390 or the preview step 335 can be entirely omitted.

4. Document Generation Example. FIGS. 4(a)–(c) show an example of creating an assembled document (FIG. 4c) from a form document (FIG. 4a) using case information stored in the case table 230 (FIG. 4b).

A form document 400 is shown in FIG. 4(a), and by way of example, is a Motion For Summary Judgment. The form document 400 is stored in form document field 280 in the forms table 270. The form document 400 contains form-fields 410 (e.g., <CRT>, <DN>, etc.). In addition, the form document 400 has generic or form text 415 (e.g., "MOTION FOR SUMMARY JUDGMENT" and "Respectfully Submitted", in addition to formatting such as a signature line) that is common to every Motion For Summary Judgment and instructional text 420 (e.g., "Insert Facts") that is used to indicate areas that must be filled out by the user before filing the resulting or assembled document.

When an assembled document is generated (e.g., step 330 in FIG. 3), the host computer 150 accesses the form document 400 from the forms table 270 and combines case data 435 previously stored (e.g., step 320 in FIG. 3) in the case table 230 corresponding to the user ID 210 and/or case ID 440 (i.e., 235 in FIG. 2(b)), shown in FIG. 4(b). The case information field 240 contains a reference 430 to the form field 410 and the corresponding case data 435. For the example shown in FIG. 4(b), the reference 430 (e.g., DN) to the form field 410 (e.g., DN) contains the corresponding court of jurisdiction (e.g., Denver); the court docket number (e.g., 99-10434); the plaintiff (e.g., John Doe); etc. are stored in the case information field 240 for the corresponding case ID 440 (e.g., 10110/3A).

The assembled document 450 is shown in FIG. 4(c). The assembled document 450 contains the form text 415 and the instructional text 420 from the form document 400. In addition, the host computer 150 has inserted the case information 435 (e.g., the caption) into the corresponding form fields 410. Other information can also be inserted where appropriate (e.g., dates from the docket can be inserted into a case management order). Any case information 435 not recorded in the case information field 240 is left blank or is optionally filled with appropriate instructional text 420 so that the user can fill this out before submission (e.g., filing with the court). For example, if the court of jurisdiction. (e.g., Denver) was not recorded in step 320 in FIG. 3, the assembled document 450 could read as follows:

_____ COUNTY COURT

OR (Insert Court) COUNTY COURT

In a preferred embodiment, the user is "forced" to fill in each "blank" requiring user input text. In other words, each "blank" is highlighted or even associated with a macro that steps the user through each "blank" in the assembled document. Often, when using form documents, the user omits a "blank", or due to oversight, leaves case information from prior use of the document in the new document. For example, the user replaces the Buyer's name in the first two paragraphs of a contract, but in the third paragraph, the user fails to replace the Buyer's name from the previously drafted contract. Therefore the present invention generates documents having only the case information for that particular case along with the appropriate "blanks" or instructional text (i.e., "blanks" are not filled in with case data from prior cases) each time the assembled document is generated. As such, the present invention reduces the occurrence of errors due to the user's oversight. Other alternate embodiments will occur to those skilled in the art and the present invention is not to be limited by the method of handling unrecorded case data 435.

It is to be expressly understood that the above example is merely intended to be exemplary and is not intended to limit the method of the present invention in any way. For example, any assembled document 450 (e.g.,.Answer, Motion, Client Letter, etc.) can be generated using the appropriate form document 400. Likewise, any appropriate form fields 410, form text 415, and instructional text 420 can be used under the teachings of the present invention.

Figure 5:
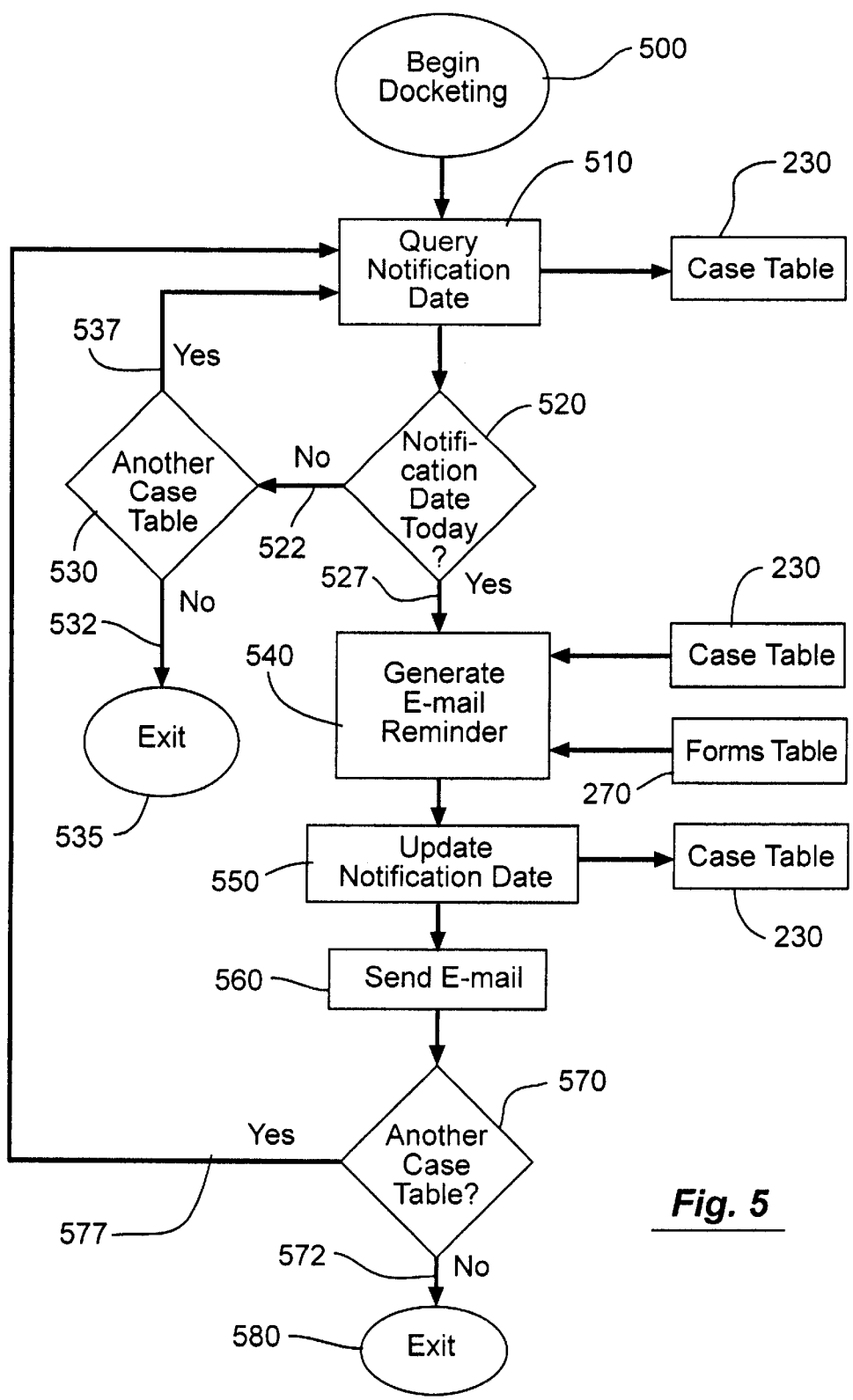
FIG. 5 sets forth a flow chart of a method of the present invention for sending reminders based on a generated docket.

5. Docket Reminder Method. FIG. 5 sets forth a flow chart of a docket reminder method of the present invention. The docketing reminder method is started at predetermined intervals (e.g., each week, each day, each hour, etc.) in step 500. Once started, the host computer 150 queries the notification field 255 in each case table 230 in step 510. That is, the host computer 150 accesses memory 165 and retrieves each case table 230 (e.g., CT1, CT2, . . . CTi) in turn.

The host computer 150 then compares the notification date in the notification date field 255 of the selected case table 230 to today's date. If the notification date is not today's date, the host computer 150 proceeds 522 to determine if there is another case table 230 to be compared in stage 530. If there are no other case tables 230 to be compared, that is, a case table 230 that has not yet been compared at the given interval, the host computer 150 exits 532 the docketing routine at stage 535. If on the other hand, there is another case table 230 that has not been compared at the given interval, the host. computer 150 returns 537 to step 510 to query the notification field 255 in the remaining case table(s) 230.

If the queried notification date is the same as today's date in step 520, the host computer 150 proceeds 527 to step 540 where a reminder or notification (e.g., an email) is generated based on the email information previously stored for the selected case table 230 in the contact information field 260. Optionally, the host computer 150 also generates the assembled document corresponding to the notification date. For example, if the notification date corresponds to the critical date for filing the Answer, as recorded by the docket stored in the docket field 245 of the case table 230, the host computer 150 generates the Answer as explained above with respect to FIG. 3 and sends the assembled document to the user workstation 110 (e.g., as an attachment to the reminder email).

The reminder is preferably an email, however the reminder can take any suitable form including a direct telephone call from the administrator to the user, a page to a designated pager, etc. Typically, the reminder will be generated when the host computer 150 or administrator accesses the case table 230 and retrieves the contact information (e.g., the email address) from the contact information field 260. In a preferred embodiment, multiple recipients can be specified (e.g., by stringing email addresses together). For example, the reminder can be sent to the attorney, the attorney's secretary, paralegal, the client, etc.; the reminder can be sent to the insurance adjuster, the supervisor, the agent, etc. In another embodiment, the reminder can be sent to the buyer, seller, agent, lender, etc. An example of an email message generated in step 540 is given in Table IV:

TABLE IV

| TO: | jbulldog@lawfirm.com |
|---|---|
| FROM: | administrator@website.com |
| ATTACHMENTS: | answer.txt |
| MESSAGE: | June 25, 1999 |
| | RE: Case ID 10010/3A |
| | Dear J. Bulldog III, Esq.: |
| | The ANSWER must be filed with the |
| | DENVER County Court on JULY 1, 1999 in |
| | the above referenced case. Attached is a |
| | copy of the Answer. |

The example email message shown in Table IV is preferably a form email message having form fields that are automatically filled in based on information stored in the case table 230 similar to that described for filling out the form-fields in the form document 400 in FIG. 4(*a*). In a preferred embodiment, the reminder also specifies if an assembled document is included (e.g., as an attachment), and if additional processing (i.e., filling in the argument of the motion) is required by the user other than simply signing the assembled document. Language common to all reminders can also be added (e.g., disclaimers, advertisements, etc.), as can citations or hyperlinks to on-line policy or procedural manuals, instructions, or other sources of additional information or service providers (e.g., process servers, lending companies, repair centers, etc.).

The content of the reminder can vary according to its purpose. For example, a reminder sent notifying the user of a deadline for the opposing party can include, for example, a Motion for Default Judgment as an attachment and "boilerplate" language advising the user that the opposing party's failure to file an Answer by the required deadline may result in a default judgment, sanctions, admissions, etc. Other language informing the user of investigative procedures, filings, etc. can be included. The reminder can also serve as a reminder that the client or attorney has an appointment with a medical professional or expert witness, a deposition, pretrial conference, etc.

Preferably, step 540 includes an affirmative acknowledgement of the reminder by the user. In other words, the host computer 150 must receive confirmation from the user workstation 110 that the reminder has been received. The affirmative acknowledgement can include a return email from the user workstation received at the host computer 150, a telephone call from the user to the administrator who then makes the appropriate notation in the case table, a return fax, etc. The affirmative acknowledgement can either be a known response by the user, as just described, or can be an unknown, but affirmative response, such as downloading the corresponding document, or a receipt email sent by the user's ISP.

Also in a preferred embodiment, the host computer 150 continuously (e.g., at a predetermined interval such as every 6 hours) transmits additional reminders until an affirmative acknowledgement is received. For instance, the first reminder can be an email and when an affirmative acknowledgement is not received by the host computer 150 from the user workstation 110, a recorded message can be sent (e.g., by telephone), followed by a facsimile transmission. In this manner, the method uses alternative reminders in the event that the email system, facsimile system, etc. do not work (e.g., the user's ISP is down for repairs).

Optionally, a warning (e.g., a prompt, email message, etc.) can also be transmitted from the host computer 150 to the administrator notifying the administrator of the failed reminder attempt. It is to be expressly understood that any suitable affirmative acknowledgement method can be implemented under the teachings of the present invention. In this manner, the method of the present invention reduces the potential for missed deadlines which can result in a dismissed case with or without prejudice, party admissions, default judgment, sanctions, malpractice, etc.

The host computer 150 proceeds in step 550 by updating the notification date stored in the case table 230. That is, the host computer 150 clears the notification date currently stored in the notification field of the case table 230 (e.g., today's date) and accesses the docket from the docket field 245 of the case table 230 to determine the next critical date, and hence next notification date. For example, if a Notice to Set is due thirty days after filing the Answer, the host computer 150 computes the next notification date by adding thirty days to today's date and storing the new notification date in the notification field 255 in the case table 230. Note, that in the example given, by adding thirty days to today's date, the new notification date will give the same advance notification for each subsequent critical date. However, this is only one embodiment, and any suitable algorithm for determining the new notification date can be used under the teachings of the present invention. For example, where only a five day advance notice is desired for the Answer, perhaps a ten day notice is desired for the Notice to Set. In other embodiments, when different documents are due based on different filing dates, the algorithm can be adjusted accordingly. Conventional algorithms can be used to compute notification dates and the above example is not intended to limit the present invention to the method of determining the notification date.

It is to be expressly understood that the notification date can be preset with an advance warning (e.g., five days before the critical date), or the system can be set where the notification date is the same as the critical date and the host computer 150 automatically compares the notification date to an advance date (e.g., five days before the critical date) in step 520. Alternately, the notification date and the critical date can be the same date and no advance warning is given. Likewise, where a reminder is sent in advance of the critical date, a second reminder can be sent on the critical date. For example, the document can be sent in advance of the critical date and simply a reminder to file sent on the critical date.

It is also to be expressly understood that although in the preferred embodiment the host computer 150 queries each case table 230 at equal intervals to avoid missing a notification date, in another embodiment, the host computer 150 can be set to query some case tables 230 at different intervals then others. For example, the case tables 230 for divorce can be queried each day, while case tables for bankruptcy can be queried monthly, etc.

The host computer 150 sends the reminder from the website 140 in step 560 through the network backbone 120 to the user workstation 110. Alternatively, the Host computer may first receive the reminder for additional processing (e.g., updating the amount owed, providing tips, etc.) and then be sent directly from the host computer 150 over the network backbone 120 to the user workstation 110. In addition, in a preferred embodiment, an email or other notification is sent to the host computer 150 in step 560 indicating each user that a reminder was sent to or any other action that was taken (e.g., whether an assembled document was sent, applicable deadlines, error messages, etc.) for record-keeping. Likewise, reminders that must be processed by the administrator (e.g., to add a billing reminder) before being sent to the user are also identified.

Again in step 570, the host computer 150 determines whether there are any remaining case tables 230 that have not already been queried. If there are remaining case tables 230 to query, the host computer 150 returns 577 to query these case tables 230 in step 510. Otherwise, the host computer 150 proceeds 572 to exit the docketing routine in step 580.

6. Confidentiality. In a preferred embodiment, the confidentiality of attorney work product and client communications is maintained. In a preferred embodiment, only publicly available information is transmitted between the user workstation 110 and the website 140. That is, only information such as the party names, attorney, court, docket number, etc. are transmitted to the website 140 and stored in the case table 230. Other relevant case data may be transmitted, however, confidential communications between the client and the attorney are not transmitted to the website 140. Instead, the publicly available case data is input by the host computer 150 to the form document to create the assembled document which is then transmitted to the user workstation 110 where the attorney can edit the assembled document to contain any work privileged or confidential information.

Optionally, access to the website 140 (i.e., after the user ID and password are verified) only occurs over a secure communication link using conventionally available encryption technology (e.g., PRETTY GOOD PRIVACY (PGP) software).

It is to be expressly understood that the method of the present invention can be modified for any deadline-driven work, such as appellate litigation, administrative proceedings, workers compensation claims, domestic relations, probate, statute of limitations, etc., and can further be modified according to the jurisdictional requirements of most courts and agencies including those at the federal, state and local levels. In addition, although the above examples relate to legal document assembly and docketing, such examples are not intended to limit the scope of the present invention. The present invention can also be modified for non-legal application, such as real estate transactions, insurance claims handling, or doctor offices (e.g., reminders can be sent based on patient age for various check-ups or self examination reminders).

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

I claim:

1. An online document assembly and docketing method using a user workstation interconnected over a network backbone to a website, the method comprising the steps of:

receiving identification information at the website from the user workstation over the network backbone;

retrieving case data at the website from the user workstation over the network backbone;

storing at the website the retrieved case data in a case table corresponding to the identification information;

generating a docket based on the retrieved case data;

notifying the user workstation over the network backbone when a critical date occurs in the generated docket;

assembling a document corresponding to the critical date from a form table at the website using the stored case data;

delivering the assembled document to the user workstation over the network backbone.

2. The online document assembly and docketing method of claim 1 further comprising the step of online case management.

3. The online document assembly and docketing method of claim 1 further comprising the step of filing documents online.

4. The online document assembly and docketing method of claim 1 wherein the identification information includes a user identification, password, and case identification.

5. The online document assembly and docketing method of claim 1 wherein the case data includes verification data, caption signature block data, and certificate of mailing data, and at least one trigger date.

6. The online document assembly and docketing method of claim 5 wherein the step of generating a docket is based on the at least one trigger date.

7. The online document assembly and docketing method of claim 1 further comprising the step of updating the received identification information in a user table at the website.

8. The online document assembly and docketing method of claim 1 further comprising the step of registering a new user at the website.

9. The online document assembly and docketing method of claim 1 further comprising the step of permitting access to the website from the user workstation over the network backbone only when the received identification information includes a valid password.

10. The online document assembly and docketing method of claim 1 further comprising the step of previewing the assembled document at the user workstation over the network backbone.

11. The online document assembly and docketing method of claim 1 wherein the step of assembling includes the step of adding the critical date from the generated docket to the assembled document.

12. The online document assembly and docketing method of claim 1 further comprising the step of transmitting at least one reminder from the website to the user workstation over the network backbone based on the generated docket.

13. The online document assembly and docketing method of claim 12 wherein the step of delivering the assembled document is in conjunction with the step of transmitting the reminder to the user workstation.

14. The online document assembly and docketing method of claim 1 further comprising the step of displaying a disclaimer at the user workstation prior to the step of delivering the assembled document from the website over the network backbone.

15. The online document assembly and docketing method of claim 1 further including the steps of:
  retrieving payment information input at the user workstation over the network backbone;
  verifying the retrieved payment information at the website;
  delivering the assembled document over the network backbone to the user workstation only if the payment information is approved.

16. The online document assembly and docketing method of claim 1 further comprising the steps of:
  acquiring a new trigger date from the user workstation over the network backbone;
  updating the docket at the website based on the new trigger date.

17. The online document assembly and docketing method of claim 16 wherein the generated docket is preserved at least in part.

18. The online document assembly and docketing method of claim 1 wherein the step of notifying the user workstation when the critical date occurs in the docket happens in advance of the critical date.

19. The online document assembly and docketing method of claim 1 wherein the step of notifying the user workstation when a critical date occurs in the docket happens on the critical date.

20. An online document assembly and docketing method using a user workstation interconnected over a network backbone to a website, the method comprising the steps of:
  registering identification information in a user table when a new user accesses the website;
  receiving the identification information at the website from the user workstation over the network backbone after registering the identification information;
  updating the received identification information in the user table at the website;
  retrieving case data at the website from the user workstation over the network backbone;
  storing at the website the retrieved case data in a case table corresponding to the identification information;
  assembling a document corresponding to the critical date from a form table at the website using the stored case data;
  delivering the assembled document to the user workstation over the network backbone;
  generating a docket based on the retrieved case data;
  sending a notification to the user workstation over the network backbone when a critical date occurs in the generated docket.

21. The online document assembly and docketing method of claim 20 further comprising the step of online case management.

22. The online document assembly and docketing method of claim 20 further comprising the step of filing documents online.

23. The online document assembly and docketing method of claim 20 wherein the identification information includes a user identification, password, and case identification.

24. The online document assembly and docketing method of claim 20 wherein the case data includes verification data, caption and certification data, and a t least one trigger date.

25. The online document assembly and docketing method of claim 24 wherein the step of generating a docket is based on the at least one trigger date.

26. The online document assembly and docketing method of claim 20 further comprising the step of permitting access to the website from the user workstation over the network backbone only when the received identification information includes a valid password.

27. The online document assembly and docketing method of claim 20 further comprising the step of previewing the assembled document at the user workstation over the network backbone.

28. The online document assembly and docketing method of claim 20 wherein the step of assembling includes the step of adding the critical date from the generated docket to the assembled document.

29. The online document assembly and docketing method of claim 20 further comprising the step of transmitting at least one reminder from the website to the user workstation over the network backbone based on the generated docket.

30. The online document assembly and docketing method of claim 29 wherein the step of delivering the assembled document is in conjunction with the step of transmitting the user workstation of the critical date.

31. The online document assembly and docketing method of claim 20 further comprising the step of displaying a disclaimer at the user workstation prior to the step of delivering the assembled document from the website over the network backbone.

32. The online document assembly and docketing method of claim 20 further including the steps of:
  acquiring payment information input at the user workstation over the network backbone;
  verifying the retrieved payment information at the website;
  delivering the assembled document over the network backbone to the user workstation only if the payment information is approved.

33. The online document assembly and docketing method of claim 20 further comprising the steps of:
  retrieving a new trigger date from the user workstation over the network backbone;
  updating the docket at the website based on the new trigger date.

34. The online document assembly and docketing method of claim 33 wherein the generated docket is preserved at least in part.

35. The online document assembly and docketing method of claim 20 wherein the step of sending a notification the user workstation when the critical date occurs in the docket happens in advance of the critical date.

36. The online document assembly and docketing method of claim 20 wherein the step of sending a notification to the user workstation when a critical date occurs in the docket happens on the critical date.

37. An online document assembly and docketing method using a user workstation interconnected over a network backbone to a website, the method comprising the steps of:

registering a new user at the user workstation by:
  a) receiving identification information at the website, the identification information including a user identification, password, and case identification, and
  b) storing the received identification information in a user table;
receiving identification information at the website from a registered user at the website;
connecting the user workstation of the registered user to the website only after receiving a valid password at the website;
updating the received identification information in the user table at the website;
retrieving case data at the website from the user workstation over the network backbone, the case data including verification data, caption and certification data, and at least one trigger date;
storing at the website the retrieved case data in a case table corresponding to the identification information;
providing an assembled document to the user workstation by:
  a) accessing a form document from a form table at the website,
  b) inserting the stored case data into the form document to create an assembled document,
  c) previewing the assembled document at the user workstation over the network backbone, and
  d) delivering the assembled document to the user workstation over the network backbone;
providing a reminder to the user workstation by:
  a) generating a docket based on the retrieved trigger date, and
  b) sending a notification to the user workstation over the network backbone when a critical date occurs in the generated docket.

38. The online document assembly and docketing method of claim 37 further comprising the step of online case management.

39. The online document assembly and docketing method of claim 37 further comprising the step of filing documents online.

40. The online document assembly and docketing method of claim 37 wherein the step of delivering the assembled document is in conjunction with the step of notifying the user workstation of the critical date.

41. The online document assembly and docketing method of claim 37 further comprising the step of displaying a disclaimer at the user workstation prior to the step of delivering the assembled document from the website over the network backbone.

42. The online document assembly and docketing method of claim 37 further including the steps of:
  retrieving payment information input at the user workstation over the network backbone;
  verifying the retrieved payment information at the website;
  delivering the assembled document over the network backbone to the user workstation only if the payment information is approved.

43. The online document assembly and docketing method of claim 37 further comprising the steps of:
  retrieving a new trigger date from the user workstation over the network backbone;
  updating the docket at the website based on the new trigger date.

44. The online document assembly and docketing method of claim 43 wherein the generated docket is preserved at least in part.

45. The online document assembly and docketing method of claim 37 wherein the step of notifying the user workstation when the critical date occurs in the docket happens in advance of the critical date.

46. The online document assembly and docketing method of claim 37 wherein the step of sending a notification to the user workstation when a critical date occurs in the docket happens on the critical date.

47. An online docketing method using a user workstation interconnected over a network backbone to a website, the method comprising the steps of:
  automatically querying a notification field in a case table at the website;
  comparing at the website an existing notification date stored in the notification field to today's date;
  generating a reminder at the website when the existing notification date is today's date;
  sending the generated reminder from the website to the user workstation over the network backbone.

48. The online docketing method of claim 47 further comprising the steps of:
  determining at the website a new notification date after the step of sending the generated reminder;
  storing the new notification date in the notification field.

49. The online docketing method of claim 47 further comprising the step of transmitting an assembled document corresponding to the existing notification date to the user workstation with the reminder.

50. The online docketing method of claim 49 wherein the assembled document is generated at the website using a forms table and the case table.

51. The online docketing method of claim 47 wherein the reminder is an email.

52. The online docketing method of claim 47 wherein the reminder is a personalized user homepage.

53. The online docketing method of claim 47 wherein the notification date is a critical date.

54. The online docketing method of claim 47 wherein the notification date is before the critical date.

55. The online docketing method of claim 47 wherein the reminder is based on data stored in the case table.

56. The online docketing method of claim 47 further comprising the steps of:
  receiving at the website an updated critical date from the user workstation over the network backbone; and
  storing the updated critical date in the notification field at the website.

57. An online docketing method using a user workstation interconnected over a network backbone to a website, the method comprising the steps of:
  automatically querying a notification field in a case table at the website;
  comparing at the website an existing notification date stored in the notification field to today's date;
  generating a reminder at the website when the existing notification date is today's date;
  sending the generated reminder and an assembled document to the user workstation over the network backbone from the website;
  determining a new notification date at the website;
  storing the new notification date in the notification field in the case table at the website.

58. The online docketing method of claim 57 further comprising the steps of:

determining at the website a new notification date after the step of sending the generated reminder;

storing the new notification date in the notification field.

59. The online docketing method of claim 57 wherein the assembled document is generated at the website using a forms table and the case table.

60. The online docketing method of claim 57 wherein the reminder is an email.

61. The online docketing method of claim 57 wherein the reminder is a personalized user homepage.

62. The online docketing method of claim 57 wherein the notification date is the critical date.

63. The online docketing method of claim 57 wherein the notification date is before the critical date.

64. The online docketing method of claim 57 wherein the reminder is based on data stored in the case table.

65. The online docketing method of claim 57 further comprising the steps of:

receiving at the website an updated critical date from the user workstation over the network backbone; and storing the updated critical date in the notification field at the website.

66. An online docketing method using a user workstation interconnected over a network backbone to a website, the method comprising the steps of:

generating a docket having at least one critical date based on a trigger date input at the user workstation;

determining an existing notification date based on the at least one critical date;

storing the existing notification date in a notification field in a case table at the website based on the generated docket;

automatically querying the notification field at the website for the existing notification date;

comparing the existing notification date to today's date;

generating a reminder when the existing notification date is today's date;

sending the generated reminder and an assembled document to the user workstation over the network backbone from the website.

67. The online docketing method of claim 66 further comprising the steps of:

determining at the website a new notification date after the step of sending the generated reminder;

storing the new notification date in the notification field.

68. The online docketing method of claim 66 wherein the reminder is an email.

69. The online docketing method of claim 66 wherein the reminder is a personalized user homepage.

70. The online docketing method of claim 66 wherein the notification date is the critical date.

71. The online docketing method of claim 66 wherein the notification date is before the critical date.

72. The online docketing method of claim 66 wherein the reminder is based on data stored in the case table.

73. The online docketing method of claim 66 further comprising the steps of:

receiving at the website an updated critical date from the user workstation over the network backbone; and storing the updated critical date in the notification field at the website.

\* \* \* \* \*